(12) United States Patent
Kalajian et al.

(10) Patent No.: US 7,366,974 B2
(45) Date of Patent: Apr. 29, 2008

(54) SYSTEM AND METHOD FOR MANAGING TEMPLATE ATTRIBUTES

(75) Inventors: Henri Kalajian, Holmdel, NJ (US); Desmond Jonas, River Edge, NJ (US)

(73) Assignee: JP Morgan Chase Bank, New York, NY (US)

( * ) Notice: Subject to any disclaimer, the term of this patent is extended or adjusted under 35 U.S.C. 154(b) by 361 days.

(21) Appl. No.: 10/933,848

(22) Filed: Sep. 3, 2004

(65) Prior Publication Data
US 2006/0053369 A1    Mar. 9, 2006

(51) Int. Cl.
G06F 17/21    (2006.01)
G06F 17/24    (2006.01)

(52) U.S. Cl. ............... 715/248; 715/229; 715/243; 707/10; 707/203

(58) Field of Classification Search .......... 715/500, 715/511, 513, 517, 522, 200, 229, 234, 243, 715/248; 707/10, 203
See application file for complete search history.

(56) References Cited

U.S. PATENT DOCUMENTS

| | | | |
|---|---|---|---|
| 3,872,448 A | 3/1975 | Mitchell, Jr. | |
| 5,159,687 A | 10/1992 | Richburg | |
| 5,168,444 A | 12/1992 | Cukor et al. | |
| 5,202,986 A | 4/1993 | Nickel | |
| 5,278,982 A | 1/1994 | Daniels et al. | |
| 5,313,616 A | 5/1994 | Cline et al. | |
| 5,347,518 A | 9/1994 | Lee | |
| 5,455,946 A | 10/1995 | Mohan et al. | |
| 5,471,613 A | 11/1995 | Banning et al. | |
| 5,630,173 A | 5/1997 | Oprescu | |
| 5,701,471 A | 12/1997 | Subramanyam | |
| 5,748,878 A | 5/1998 | Rees et al. | |
| 5,752,034 A | 5/1998 | Srivastava | |
| 5,758,061 A | 5/1998 | Plum | |
| 5,764,972 A | 6/1998 | Crouse et al. | |
| 5,774,553 A | 6/1998 | Rosen | |
| 5,784,557 A | 7/1998 | Oprescu | |

(Continued)

FOREIGN PATENT DOCUMENTS

WO    WO 95/03586    2/1995

(Continued)

OTHER PUBLICATIONS

Chen et al.; Improving Index Performance Through Prefetching School of Computer Science Carnegie Mellon University, Dec. 2000.

(Continued)

*Primary Examiner*—Stephen Hong
*Assistant Examiner*—Joshua Campbell
(74) *Attorney, Agent, or Firm*—Lowenstein Sandler, PC

(57) ABSTRACT

According to the invention, this invention redefines the concept of a template as a set of template attributes, such as font types and color schemes, that are accessed by document-generating applications to provide uniform functionality across an organization. The template attributes are stored and distributed throughout an organization in lieu of full document templates in order to reduce storage and transmission bandwidth requirements. The template attributes are distributed from a global server to regional servers and then to user workstations to facilitate propagation and enforcement of organization-wide document formatting protocols.

9 Claims, 5 Drawing Sheets

U.S. PATENT DOCUMENTS

| | | | |
|---|---|---|---|
| 5,787,402 A | 7/1998 | Potter et al. | |
| 5,828,883 A | 10/1998 | Hall | |
| 5,832,523 A | 11/1998 | Kanai et al. | |
| 5,835,770 A | 11/1998 | Shum et al. | |
| 5,845,293 A | 12/1998 | Veghte et al. | |
| 5,872,976 A | 2/1999 | Yee et al. | |
| 5,907,846 A | 5/1999 | Berner et al. | |
| 5,920,719 A | 7/1999 | Sutton et al. | |
| 5,978,477 A | 11/1999 | Hull et al. | |
| 6,009,405 A | 12/1999 | Leymann et al. | |
| 6,012,087 A | 1/2000 | Freivald et al. | |
| 6,014,671 A | 1/2000 | Castelli et al. | |
| 6,026,237 A | 2/2000 | Berry et al. | |
| 6,029,002 A | 2/2000 | Afifi et al. | |
| 6,058,393 A | 5/2000 | Meier et al. | |
| 6,065,009 A | 5/2000 | Leymann et al. | |
| 6,081,808 A | 6/2000 | Blackman et al. | |
| 6,108,698 A | 8/2000 | Tenev et al. | |
| 6,125,390 A | 9/2000 | Touboul | |
| 6,138,112 A | 10/2000 | Slutz | |
| 6,145,121 A | 11/2000 | Levy et al. | |
| 6,163,776 A | 12/2000 | Periwal | |
| 6,167,534 A | 12/2000 | Straathof et al. | |
| 6,188,400 B1 | 2/2001 | House et al. | |
| 6,226,652 B1 | 5/2001 | Percival et al. | |
| 6,237,143 B1 | 5/2001 | Fontana et al. | |
| 6,243,862 B1 | 6/2001 | Lebow | |
| 6,256,635 B1 | 7/2001 | Arrouye et al. | |
| 6,263,121 B1 | 7/2001 | Melen et al. | |
| 6,266,683 B1 | 7/2001 | Yehuda et al. | |
| 6,269,479 B1 | 7/2001 | Puram | |
| 6,279,008 B1 | 8/2001 | Tung Ng et al. | |
| 6,301,701 B1 | 10/2001 | Walker et al. | |
| 6,311,320 B1 | 10/2001 | Jibbe | |
| 6,311,327 B1 | 10/2001 | O'Brien et al. | |
| 6,336,122 B1 | 1/2002 | Lee et al. | |
| 6,356,920 B1 | 3/2002 | Vandersluis | |
| 6,381,609 B1 | 4/2002 | Breitbart et al. | |
| 6,385,618 B1 | 5/2002 | Ng et al. | |
| 6,397,221 B1 | 5/2002 | Greef et al. | |
| 6,405,209 B2 | 6/2002 | Obendorf | |
| 6,411,957 B1 | 6/2002 | Dijkstra | |
| 6,418,446 B1 | 7/2002 | Lection et al. | |
| 6,418,448 B1 | 7/2002 | Sarkar | |
| 6,418,451 B1 | 7/2002 | Maimone | |
| 6,449,623 B1 | 9/2002 | Bohannon et al. | |
| 6,453,310 B1 | 9/2002 | Zander | |
| 6,456,995 B1 | 9/2002 | Salo et al. | |
| 6,467,052 B1 | 10/2002 | Kaler et al. | |
| 6,477,540 B1 | 11/2002 | Singh et al. | |
| 6,490,581 B1 | 12/2002 | Neshatfar et al. | |
| 6,502,095 B2 | 12/2002 | Breitbart et al. | |
| 6,502,104 B2 | 12/2002 | Fung et al. | |
| 6,532,467 B1 | 3/2003 | Brocklebank et al. | |
| 6,535,894 B1 | 3/2003 | Schmidt et al. | |
| 6,539,337 B1 | 3/2003 | Provan et al. | |
| 6,539,383 B2 | 3/2003 | Charlet et al. | |
| 6,539,397 B1 | 3/2003 | Doan et al. | |
| 6,539,398 B1 | 3/2003 | Hannan et al. | |
| 6,557,039 B1 | 4/2003 | Leong et al. | |
| 6,571,249 B1 | 5/2003 | Garrecht et al. | |
| 6,574,640 B1 | 6/2003 | Stahl | |
| 6,578,044 B1 * | 6/2003 | Scheifler et al. | 707/103 R |
| 6,578,129 B1 | 6/2003 | da Silva Junior et al. | |
| 6,591,260 B1 | 7/2003 | Schwarzhoff et al. | |
| 6,601,057 B1 * | 7/2003 | Underwood et al. | 707/1 |
| 6,601,075 B1 | 7/2003 | Huang et al. | |
| 6,651,076 B1 | 11/2003 | Asano | |
| 6,665,086 B2 | 12/2003 | Hull et al. | |
| 6,678,705 B1 | 1/2004 | Berchtold et al. | |
| 6,681,380 B1 | 1/2004 | Britton et al. | |
| 6,691,139 B2 | 2/2004 | Ganesh et al. | |
| 6,697,825 B1 * | 2/2004 | Underwood et al. | 715/530 |
| 6,697,835 B1 | 2/2004 | Hanson et al. | |
| 6,701,514 B1 | 3/2004 | Haswell et al. | |
| 6,711,594 B2 | 3/2004 | Yano et al. | |
| 6,714,219 B2 | 3/2004 | Lindhorst et al. | |
| 6,763,384 B1 | 7/2004 | Gupta et al. | |
| 6,813,501 B2 * | 11/2004 | Kinnunen et al. | 455/456.2 |
| 6,880,010 B1 | 4/2005 | Webb et al. | |
| 6,918,013 B2 | 7/2005 | Jacobs et al. | |
| 6,920,467 B1 | 7/2005 | Yoshimoto | |
| 6,934,934 B1 | 8/2005 | Osborne, II et al. | |
| 6,938,072 B2 | 8/2005 | Berman et al. | |
| 7,152,207 B1 * | 12/2006 | Underwood et al. | 715/526 |
| 2002/0007287 A1 | 1/2002 | Straube et al. | |
| 2002/0029228 A1 | 3/2002 | Rodriguez et al. | |
| 2002/0038226 A1 | 3/2002 | Tyus | |
| 2002/0038320 A1 | 3/2002 | Brook | |
| 2002/0049666 A1 | 4/2002 | Reuter et al. | |
| 2002/0065695 A1 | 5/2002 | Francoeur et al. | |
| 2002/0083034 A1 | 6/2002 | Orbanes et al. | |
| 2002/0091702 A1 | 7/2002 | Mullins | |
| 2002/0116205 A1 | 8/2002 | Ankireddipally et al. | |
| 2002/0143774 A1 | 10/2002 | Vandersluis | |
| 2002/0144101 A1 | 10/2002 | Wang et al. | |
| 2002/0178439 A1 | 11/2002 | Rich et al. | |
| 2002/0188765 A1 | 12/2002 | Fong et al. | |
| 2003/0014421 A1 | 1/2003 | Jung | |
| 2003/0018666 A1 | 1/2003 | Chen et al. | |
| 2003/0027561 A1 | 2/2003 | Iyer | |
| 2003/0046313 A1 | 3/2003 | Leung et al. | |
| 2003/0050931 A1 | 3/2003 | Harman et al. | |
| 2003/0065644 A1 | 4/2003 | Horman et al. | |
| 2003/0069975 A1 | 4/2003 | Abjanic et al. | |
| 2003/0070158 A1 | 4/2003 | Lucas et al. | |
| 2003/0088593 A1 | 5/2003 | Stickler | |
| 2003/0126151 A1 | 7/2003 | Jung | |
| 2003/0131007 A1 | 7/2003 | Schirmer et al. | |
| 2003/0140045 A1 | 7/2003 | Heninger et al. | |
| 2003/0140308 A1 | 7/2003 | Murthy et al. | |
| 2003/0145047 A1 | 7/2003 | Upton | |
| 2003/0163603 A1 | 8/2003 | Fry et al. | |
| 2003/0167266 A1 | 9/2003 | Saldanha et al. | |
| 2003/0167445 A1 | 9/2003 | Su et al. | |
| 2003/0177118 A1 | 9/2003 | Moon et al. | |
| 2003/0177341 A1 | 9/2003 | Devillers | |
| 2003/0191849 A1 | 10/2003 | Leong et al. | |
| 2003/0217033 A1 | 11/2003 | Sandler et al. | |
| 2003/0217083 A1 | 11/2003 | Taylor | |
| 2004/0060006 A1 | 3/2004 | Lindblad et al. | |
| 2004/0122872 A1 | 6/2004 | Pandya et al. | |
| 2005/0027658 A1 | 2/2005 | Moore et al. | |
| 2005/0060345 A1 | 3/2005 | Doddington | |
| 2005/0065987 A1 | 3/2005 | Telknowski et al. | |

FOREIGN PATENT DOCUMENTS

| | | |
|---|---|---|
| WO | WO 96/34350 | 10/1996 |
| WO | WO 02/046980 | 6/2002 |

OTHER PUBLICATIONS

Deng et al.; A Probabilistic Approach to Fault Diagnosis in Linear Lighwaves Network, Department of Electrical Engineering, May 1992, pp. 1-122.

Deutsch et al., Storing Semistructured Data With Stored, Proceedings of the 1999 ACM Sigmod International Conference on Management of Data, ACM, 1999, pp. 431-442.

Duggan; 2.40 General—Reviews and Abstracts, SPI Database of Software Technologies, p. 1-5, Feb. 1, 1974.

Hellerstein: A Generalized Search Tree for Database Systems, Jan. 19, 1996.

Hilbert: Hilbert, et al., An Approach to Large Scale Collection of Application Usage Data Over the Internet, Software Engineering 1998, Proceedings of the 1998 International Conference, Abstract, Apr. 1998.

Jagadish et al., Tax: A Tree Algebra for XML, Springer-Verlag, 202, pp. 149-164.

Jagadish et al., Timber, A Native XML Database, Published Online; Dec. 19, 2002, Springer-Verlag, pp. 274-291.

McConnell; Gauging Software Readiness with Defect Tracking; IEEE; May/Jun. 1997.

Moser: Transactions in a Distributed Object Environment, Department of Electrical and Computer Engineering, Jun. 19, 2005.

Programmer's Guide; Monitor Client Library 12.5; Document ID 32865:01-1250-01.

Quantitative Monitoring of Software Development By Time-Based and Intercheckpoint Monitoring, Software Engineering Journal, vol. 5, Iss. 1, p. 43-49, Abstract, Jan. 1990.

Ramakrishnan; Tree-Structured Indexes Module 2, Lectures 3 and 4.

Sammet; Beginning of 4.6 Software Evaluation, Tests and Measurements and RMF I/O Time Validation, Association of Computing Machinery, p. 519.

Strom et al.; Gryphon: An Information Flow Based Approach to Message Brokering, International Symposium on Software Reliability, Jun. 20, 2005.

Van Steen et al.; Model for Worldwide Tracking of Distributed Objects, Vrije Universiteit, Amsterdam.

Vanbommel; Genetic Algorithms for Optimal Logical Database Design Information and Software Technology, vol. 36, No. 12, p. 725-732, 1994.

Xu; Erdraw: An XML-Based ER-Diagram Drawing and Translation Tool.

Yu, et al., An Analysis of Several Software Defect Models; IEEE Transactions on Software Engineering, vol. 14., No. 9; Sep. 1988.

* cited by examiner

SYSTEM AND METHOD FOR MANAGING TEMPLATE ATTRIBUTES

FIELD OF THE INVENTION

This invention relates to managing computer-readable document templates. In particular, this invention pertains to storing template attributes in lieu of full document templates to efficiently create, organize, distribute, and apply such attributes to generate documents having a uniform appearance. More specifically, this invention redefines the concept of a template as a set of data attributes, such as font types and color schemes, that are accessed by users' applications to provide uniform functionality across an organization. Consequently, the costs associated with organizing, distributing, and introducing new or replacing old document templates are greatly reduced and productivity increased.

BACKGROUND OF THE INVENTION

Organizations often maintain thousands of documents of different types, such as letters, internal memorandums, presentations, or various forms particular to an organization's business. These organizations also often include many divisions, regions, or lines of business ("LOBs"), each including hundreds if not thousands of employees. Each of these divisions, regions, or LOBs may have a unique way of generating documents due to the characteristics particular to the them. Further, individual employees may generate documents differently due to their particular tastes, styles, and level of expertise. Additionally, familiarity with the various tools and nuances of document generating applications, such as Microsoft Powerpoint™, Word™, Excel™, etc., vary between users, creating even more inconsistencies between documents. (Microsoft Powerpoint, Word, and Excel are trademarks of the Microsoft Corporation.)

While some of these differences between documents are necessary, it is important that all documents in an organization have a similar appearance. For one reason, if a set of document formatting protocols are implemented within an organization, employees have to spend less time deciding how to format their documents, thereby increasing productivity. Further, if all documents are similar in appearance, the organization gives the impression to its customers that it is unified and well organized.

Although the benefits of having a document formatting protocol are clear, managing the many templates that implement the formatting protocol is a more difficult proposition. Conventional techniques for managing an organization's templates are largely informal. For instance, one technique is to find a previous document of the same type, such as a previous letter, duplicate it, and modify its content to fit the current situation. However, this technique assumes that the previous document had the correct formatting, which is not always the case.

Another approach is to manually create actual document templates, store them on a network accessible computer, and allow employees to access a desired template and save it to a new file for content editing. However, this approach is time inefficient in that the document templates must each individually be created, and is storage inefficient in that complete documents must be stored for each template. Further, this approach is one-dimensional in that it provides only a single list of document templates, and does not account for organization-wide formatting protocols and regional-specific formatting protocols.

Accordingly, a need in the art exists for an efficient document template management system that realizes the productivity, customer-confidence, and cost-savings benefits of uniform document appearance and functionality across an organization.

SUMMARY OF THE INVENTION

This problem is addressed and a technical solution achieved in the art by a system and method for managing template attributes. In particular, this invention redefines the concept of a template as a set of template attributes, such as font types and color schemes, that are accessed by document-generating applications to provide uniform functionality across an organization. Template attributes are stored in lieu of actual document templates, thereby reducing storage and transmission time requirements and facilitating the propagation of formatting protocols through an organization.

The set of template attributes are provided in one or more regional attribute repositories ("RARs") consisting of specific data attributes that define and support a specific region's or LOB's document format. A default RAR may exist for each region or LOB in the organization. Distribution of the template attributes is facilitated by information stored in a system information repository ("SIR"), which identifies the servers in the organization that ultimately distribute the RARs to individual users or employees. The SIR also identifies the most current versions of the RARs and the SIR to ensure that the users or employees are generating the most current document templates.

The SIR and RARs are stored in a "global" server, which distributes them to "regional" servers associated with LOBs in the organization. User workstations within a LOB download the SIR and RARs stored in their associated regional server. The user of the workstation may select the default RAR associated with their region or another RAR for use. Document-generating applications on the user workstations access the local copies of the SIR and selected RAR in order to generate document templates in accordance with the template attributes and other data stored in the SIR and chosen RAR.

By storing document template attributes in attribute repositories, the present invention simplifies document template portfolio management. By allowing users to select a particular RAR for use, the users can generate documents associated with any LOB or region in the organization. This feature is particularly useful when employees travel from one region to another, such as Europe and North America, and need to generate documents associated with the region they have traveled to. By distributing the repositories from a global level, to a regional level, and then to an individual user level in the organization, organization-wide formatting protocols are efficiently enforced.

BRIEF DESCRIPTION OF THE DRAWINGS

A more complete understanding of this invention may be obtained from a consideration of this specification taken in conjunction with the drawings, in which.

DETAILED DESCRIPTION OF THE EXEMPLARY EMBODIMENTS OF THE INVENTION

The present invention stores template attributes, such as font types, color schemes, default text, paper size, etc., that define the appearance of documents, instead of storing full document templates. These template attributes are stored in a plurality of repositories each associated with a particular division, region, or LOB of the organization. Applications that generate documents, such as a template Microsoft Powerpoint presentation, access a local copy of the repositories to generate a document template in accordance with the attributes. Although the invention is often described in the context of Microsoft Powerpoint documents, one skilled in the art will appreciate that the invention may be easily modified to apply to other types of documents, such as, for example, Microsoft Word, Microsoft Excel, text documents, email documents, web pages, etc.

One advantage of storing template attributes instead of storing full document templates is that storage requirements are markedly reduced. Another advantage is the ease in which template attributes can be managed and distributed through an organization. For example, if the template attributes are specified in a text file, an administrator can easily modify one or two specific attributes, such as paper size, or background color, with a simple text editor. In this situation, only the updated text file need be distributed through the organization to effect the update for all document templates.

On the other hand, if full document templates are used, an administrator has to open each and every document template that needs updating with a high-powered application, such as Microsoft Powerpoint. Then the administrator must make the changes to each document, such as changing the paper size and background color through the various menus in the application. Subsequently, all updated document templates must be distributed throughout the organization, thereby using much greater bandwidth and storage facilities than a simple text file update.

Figure 1:
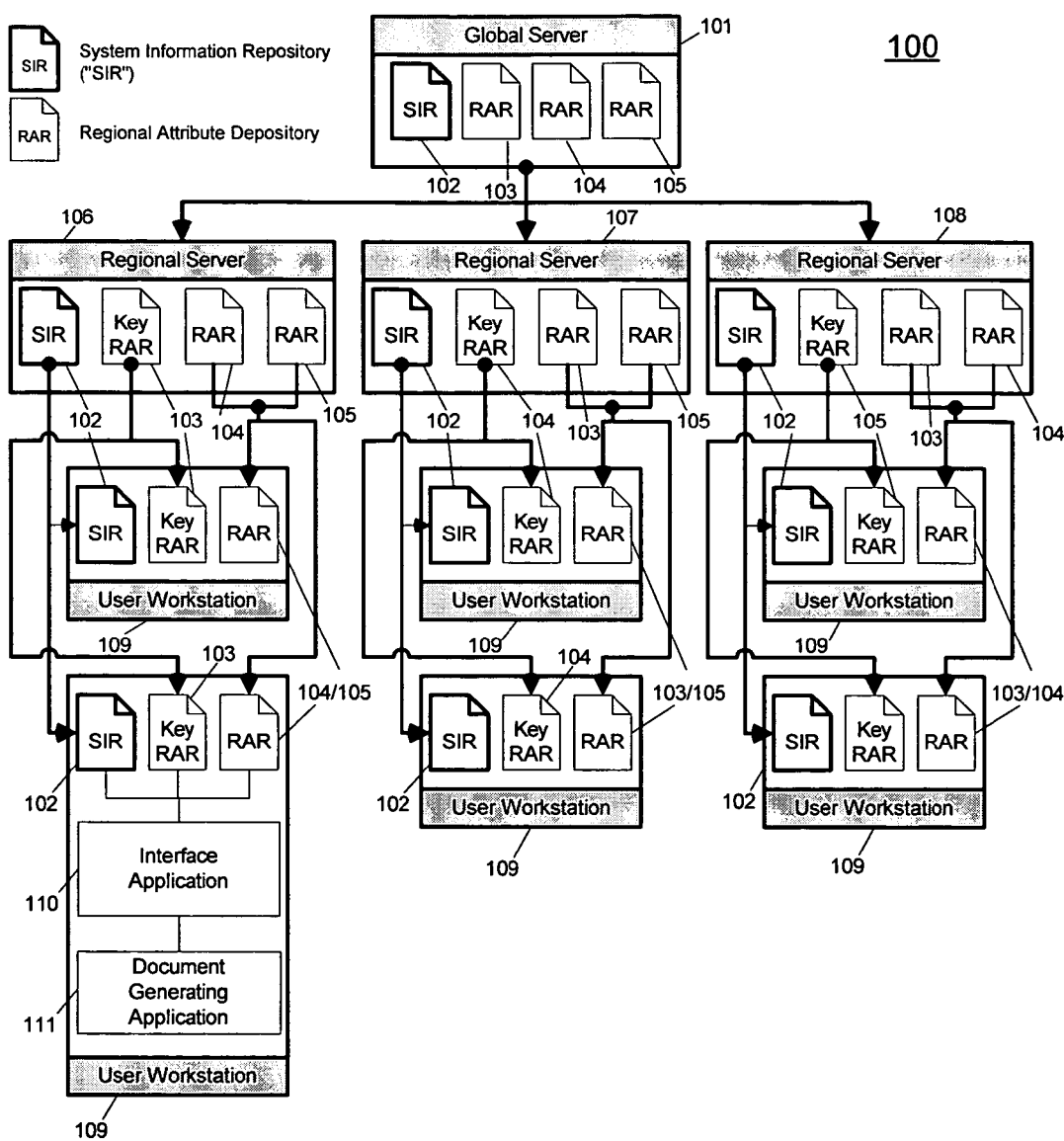
FIG. 1 illustrates a template management system according to an exemplary embodiment of the invention.

FIG. 1 illustrates a template management system 100 according to an exemplary embodiment of the invention. In particular, a global server 101 stores, in a computer-readable memory communicatively connected to it, a master set of the template attribute repositories for an entire organization. Although often discussed in the context of serving an entire organization, one skilled in the art will appreciate that the global server 101 need not serve an entire organization and may instead serve a portion of an organization, which may have multiple global servers 101. Global server 101 may be any type of computer capable of distributing data and processing data requests. The term "computer" refers to a desktop computer, a laptop computer, a personal digital assistant, or any data processing device known in the art. The computer-readable memory referred to above may be internal or external to the global server 101. The term, "computer-readable memory" refers to any man-made data storage device readable by a computer, whether volatile or non-volatile or implemented electronically or otherwise, known in the art, including floppy disks, hard disks, CD-ROMs, DVDs, flash memories, nonvolatile ROMs, and RAMs. "Communicatively connected" refers to any manner of data communication between devices known in the art, whether wired or wireless.

The master set of template attribute repositories stored in the global server 101 include one or more regional template attribute repositories ("RARs"), shown for example as 103-105. Each RAR may be associated with one or more divisions, regions, and/or LOBs in an organization. In other words, if an organization has a retail sales LOB, an institutional sales LOB, and a customer support LOB, each LOB may have its own RAR associated with it. However, the retail sales LOB and the institutional sales LOB may share an RAR, if desired. Or, if the retail sales LOB is further subdivided into a European region and a North American region, the European retail sales LOB may have an RAR associated with it, and the North American retail sales LOB may have another RAR associated with it. Although the invention is often described in the context of one division, region, and/or LOB in an organization being associated with a single RAR, one skilled in the art will appreciate that this situation is not required and that each RAR represents a set of template attributes that may be used in any desired manner.

Figure 2:
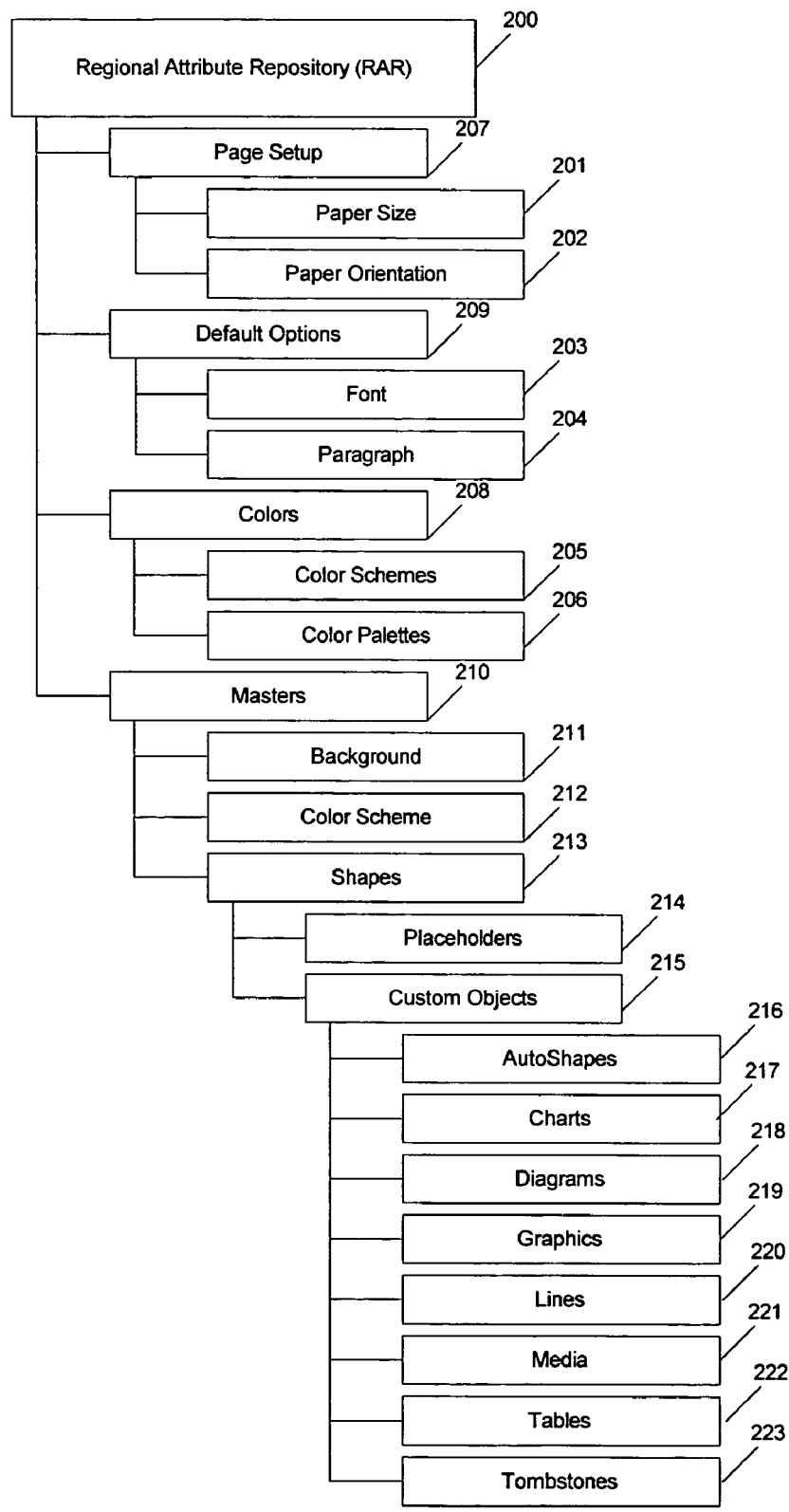
FIG. 2 is a sample regional attribute repository ("RAR") according to an exemplary embodiment.

FIG. 2 illustrates an example RAR 200 that could correspond to one or more of the RARs 103-105. The RAR 200 stores template attributes, such as paper size 201 and orientation 202, font size and type 203 and paragraph styles 204, and color schemes 205 and palettes 206, that define the format or appearance of document templates. For instance, the fonts attribute 203 may specify the default font as "Times New Roman" within a font size of 12. The RAR 200, however, does not store all data necessary to completely define a document template. In other words, the RAR 200 is not a document template itself, but instead includes attributes that define the format or appearance of document templates and are used to generate full document templates. By storing attributes in lieu of full document templates, storage and bandwidth requirements are reduced.

According to one embodiment, the RAR 200 is implemented as one or more XML configuration files having a tree-structure. The configuration files may specify the value of an attribute directly or provide a link to another file that specifies the attribute value. Although the exemplary embodiment uses one or more XML configuration files for the RAR 200, one skilled in the art will appreciate that the RAR 200 may have any format for storing information.

The RAR 200 may be divided into (a) a default attribute category including default template attributes and (b) template-type-specific attribute categories that include attributes that are specific to a particular template type. Examples of template types include a Powerpoint presentation, an internal memo compatible with Word, a fax cover sheet compatible with Word, a budget spreadsheet compatible with Excel, etc. Examples of default template attributes include a default page setup 207, default colors 208 and other default options 209 that apply to all generated document templates, regardless of the template type. An example of attributes that are specific to a template type include attributes that apply to all Powerpoint master slides 210. As shown in FIG. 2, these attributes may define the background 211, color scheme 212, and shapes 213 that apply specifically to Powerpoint master slides. These attributes override the default attributes 207-209 when the document at issue is a Powerpoint master slide. One skilled in the art will appreciate that the RARs may include portions that specifically apply to any type of document template.

Each category of attributes may be further divided into sub-attributes, such as the shapes category 213 being divided into placeholder 214 and custom object 215 attributes. As shown in FIG. 2, the custom objects attribute category is further divided into autoshape 216, chart 217, diagram 218, graphics 219, line 220, media 221, table 222, and tombstone attributes 223. Each attribute defines the format or appearance of that attribute in the document template. For example, the graphics attribute 219 may provide a link to a graphics library that identifies company logo images to be displayed on a letterhead, fax cover sheet, etc. Some or all of the attributes may also be configurable, such that a few possible options are allowable, and a user may select which option they desire. For example, the fonts attribute 203 may specify that both the "Times New Roman" and "Arial" fonts may be used, and a user may select which one he or she prefers.

Returning to FIG. 1, the global server 101 also stores a system information repository ("SIR") 102 that includes information that facilitates proper distribution of the RARs 103-105 throughout the organization. The SIR 102 stores information such as the addresses of all servers in the organization responsible for distributing and providing the RARs 103-105 to the users in the organization. The SIR 102 also includes version management information to ensure that the users in the organization are using the most current versions of the RARs 103-105. The contents of the SIR 102 will be discussed in more detail with reference to FIG. 3.

The SIR 102 and the RARs 103-105 may be modified by administrators in the organization via an appropriate user-interface. According to an embodiment of the invention, the SIR 102 is modifiable by a global administrator having sufficient access rights to the template management system 100. The RARs 103-105 may be modified by regional administrators having rights to modify only the default RAR for their particular region. One skilled in the art will appreciate that any security structure may be used to control modification rights to the SIR 102 and each of the RARs 103-105.

The SIR 102 and the RARs 103-105 are distributed to one or more regional servers 106-108 communicatively connected to the global server 101. Each regional server 106-108 each may be associated with a division, region, or LOB in the organization. When an administrator makes a change to the SIR 102 or one or more of the RARs 103-105 an update or distribution sequence may be automatically initiated. The update sequence also may be manually initiated or set to occur at predetermined times and/or dates. Further, the version numbers of the SIR 102 and the RARs 103-105 in the global server 101 may be compared to the version numbers of the SIR 102 and RARs 103-105 stored in each regional server 106-108. If it is determined that one or more of the regional servers 106-108 do not have the most current versions of the SIR 102 or RAR 103-105, the update sequence also may be initiated. When an update sequence is initiated, the current SIR 102 and RARs 103-105 are transmitted from the global server 101 to the regional servers 106-108 as needed.

In the same manner that the SIR 102 and RARs 103-105 are distributed to the regional servers 106-108, each regional server 106-108 distributes its copy of the SIR 102 and the RARs 103-105 to user workstations 109 communicatively connected to it in its region. Storing local copies of the SIR 102 and RARs 103-105 on the workstations 109 allows users to work in isolation, if needed.

Each regional server 106-108 is assigned a key RAR, or default RAR, for its region. For example, RAR 103 may include template attributes for documents used in a North American region, RAR 104 may include attributes for documents used in a European region, and RAR 105 may include attributes for documents used in an Asian region. Correspondingly, regional server 106 may serve the North American region, server 107 may serve the European region, and server 108 may serve the Asian region. Therefore, when the RARs 103-105 are distributed to the regional servers 106-108, the North American RAR 103 becomes the key RAR for the North American server 106. For the European server 107, the European RAR 104 is assigned as the key RAR. And for the Asian server 108, the Asian RAR 105 is assigned as the key RAR.

By default, an interface application 110 executed by a user workstation 109 interfaces the document generating applications, such as Microsoft Powerpoint, Word, Excel, etc., the local copy of the SIR 102, and the key RAR 103, 104, or 105, depending upon the workstation's 109 region, in order to generate a document template. Even though each regional server 106-108, and correspondingly each workstation 109, has a key RAR, the regional servers 106-108 also receive and distribute the other RARs to allow users in the region access to template attributes for other regions in the organization.

For example, if the user of a workstation 109 changes regions, which may be detected by a change in the workstation's 109 subnet, the user is queried as to whether he or she wishes to use the template attributes of the user's original region, i.e., use the key RAR, or new region, i.e., use another RAR. For example, if the user normally works in Europe, the user's key RAR reflects the European region. If the user travels to the United States on a business trip, the user is queried as to whether an RAR associated with the United States region should be used instead of the key RAR. If the user plans on generating documents for use in the United States, the user may likely use the United States RAR so that the generated documents, for example, are on letter-sized paper. However, if the user does not plan on generating documents for use in the United States, the user may likely continue to use the key RAR 308, so that generated documents, for example, are on A4 sized paper. One skilled in the art will appreciate, however, that the user need not travel to another region to switch his or her default RAR, and that the user may select any RAR for use at any time, regardless of the user's region.

Now that the manner in which the exemplary embodiment distributes the SIR 102 and the RARs 103-105 have been described, the contents of the SIR 102 will be described in more detail. The SIR 102 stores the information necessary to distribute the copies of the SIR 102 and the RARs 103-105 throughout the organization, as discussed with reference to FIG. 1. The SIR 102 also stores the information required to ensure that the user workstations 109 are using the most recent versions of the SIR 102 and the RARs 103-105.

Figure 3:
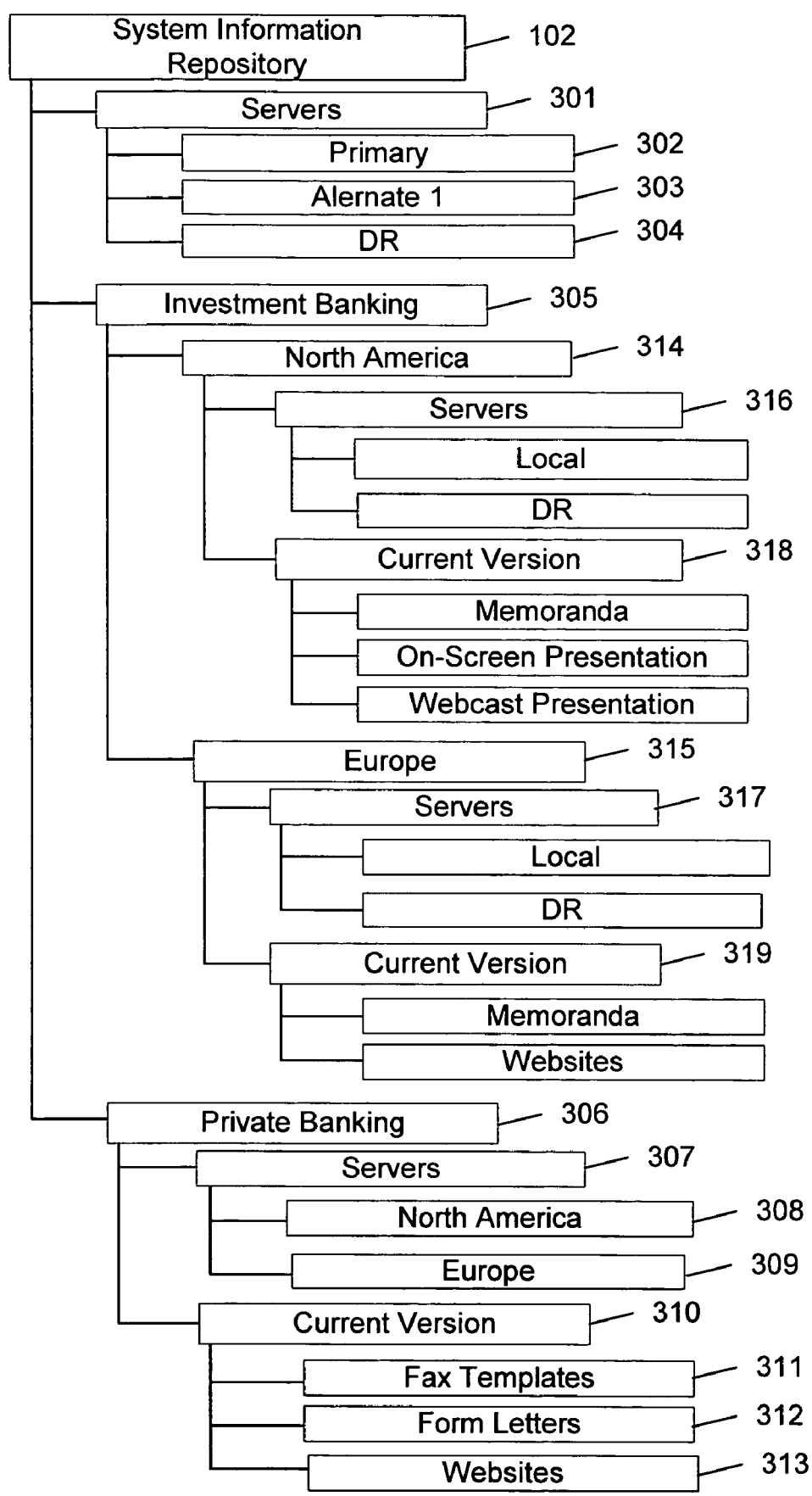
FIG. 3 is a sample system information repository ("SIR") according to an exemplary embodiment.

FIG. 3 provides an example of the contents and data structure of the SIR 102. As with the RARs 103-105, the exemplary embodiment implements the SIR 102 as one or more XML configuration files. In the example of FIG. 3, the SIR 102 is shown as having a tree-structure to match that of an XML file. However, one skilled in the art will appreciate that any format for storing information may be used. The SIR 102 may have a set of data identifying the location (address) of all global servers 101 in the template management system. In the example of FIG. 3, this data is stored under the "Servers" node 301. Along with identifying the addresses of the global servers 101, the servers node 301 may also specify which global servers are primary 302, which are alternates 303, and which are disaster recovery ("DR") servers 304.

The SIR 102 may be divided into separate divisions, regions, and/or LOBs. In the example of FIG. 3, the SIR 102 is divided into an investment banking LOB 305 and a private banking LOB 306. For each LOB in the SIR 102, the address of the global, regional, and disaster recovery servers associated with the LOBs may be stored. If the LOB has multiple regions, the addresses of the global, regional, and disaster recovery servers may be stored for each region. In the example of FIG. 3, the private banking LOB 306 has two regions, a North American region 308 and a European region 309, under which the addresses of associated global, regional, and disaster recover servers are stored as leaves.

Further, for each of the LOBs, the most current version of the template attributes may be stored. Regarding the private banking LOB example 306, such version information is stored under the "current version" node 310. In particular, the most recent version of the fax template attributes 311, form letter attributes 312, and website attributes 313 associated with this LOB are stored.

In the example of FIG. 3, the private banking LOB 306 is configured such that the entire business uses the same RAR (200, for example). This configuration is evidenced by the single servers node 307 and the single version node 310. However, each LOB may be subdivided into regions, such that each region is associated with one or more different RARs. For example, the investment banking LOB 305 is divided into a North American region 314 and a European region 315. For each region 314 and 315, a different set of servers and attribute versions are identified. In particular, the North American region 314 and the European region 315 include addresses of their own servers 316 and 317, respectively, and attribute version information regarding their own particular templates 318 and 319, respectively. One skilled in the art will appreciate that the addresses of the servers stored under nodes 316 and 317 may be directed to the same servers, but to different data files.

Figure 4:
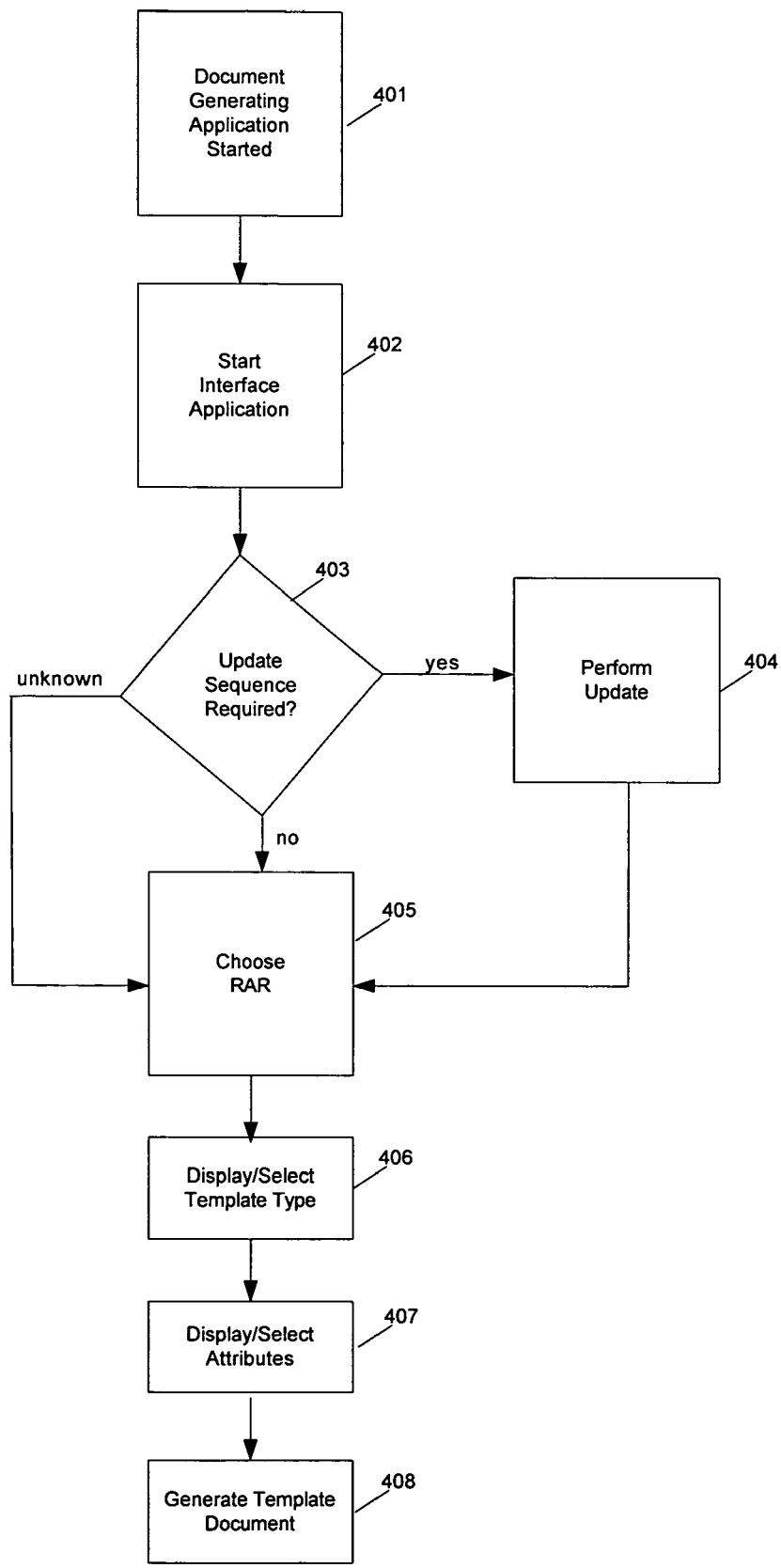
FIG. 4 illustrates a process of generating a document template according to an exemplary embodiment.

Turning now to FIG. 4, the manner in which the interface application 110 facilitates the generation of a document template according to an embodiment of the invention will now be described. As shown at 401 and 402, the interface application 110 may be configured to automatically start whenever the host document generating application 111, e.g., Powerpoint, Word, Excel, etc., is started. Although shown in only one workstation 109 in FIG. 1 for clarity, the interface application 110 and document generating application 111 are actually located within each workstation 109. Further, although shown as being resident within a workstation 109, one skilled in the art will appreciate that the interface application 110 and/or the document generating application 111 may be located external to the workstations 109 using known remote or distributed processing techniques.

The interface application 110 accesses its local copy of the SIR 102 to locate and communicate with its communicatively connected regional server (106, for example) to make sure that its workstation 109 has the most current versions of the SIR 102 and RARs 103-105. If the regional server is busy or unavailable, data contained in the local SIR 102 may be used to access the global server 101 or other regional servers 107, 108, also communicatively connected to the workstation 109 via the Internet for example. If the workstation 109 cannot communicate with any of the servers 101 and 106-108, the interface application operates in local mode, where only the pre-existing local copies of the SIR 102 and RARs 103-105 are used. In this situation, processing proceeds to 405 via 403 and the branch labeled "unknown."

If the most current versions are not locally stored on the workstation 109, an update sequence may be initiated, as shown at 403 and 404. Once it is determined that the workstation 109 has the most current versions of the SIR 102 and the RARs 103-105, processing proceeds to 405 where one of the RARs is selected for use, either by default, by querying the user, or some other process.

At 406, the interface application may display to the user all template types, such as a fax template 311, form letter 312, website 313 (FIG. 3, for example), available for the selected document generating application and the selected RAR. The available template types may be determined from the local copy of the SIR 102. Also at 406, the user selects which of the available template types he or she would like to use.

At 407, the interface application may access the selected RAR and display to the user any choices he or she has regarding configurable template attributes that pertain to the selected template type, such as available color schemes or custom objects. Once such choices have been made, the document generating application is instructed at 408 to generate a document template in accordance with the selected template type, selected attributes, and any other attributes specified in the local copy of the RAR.

Figure 5:
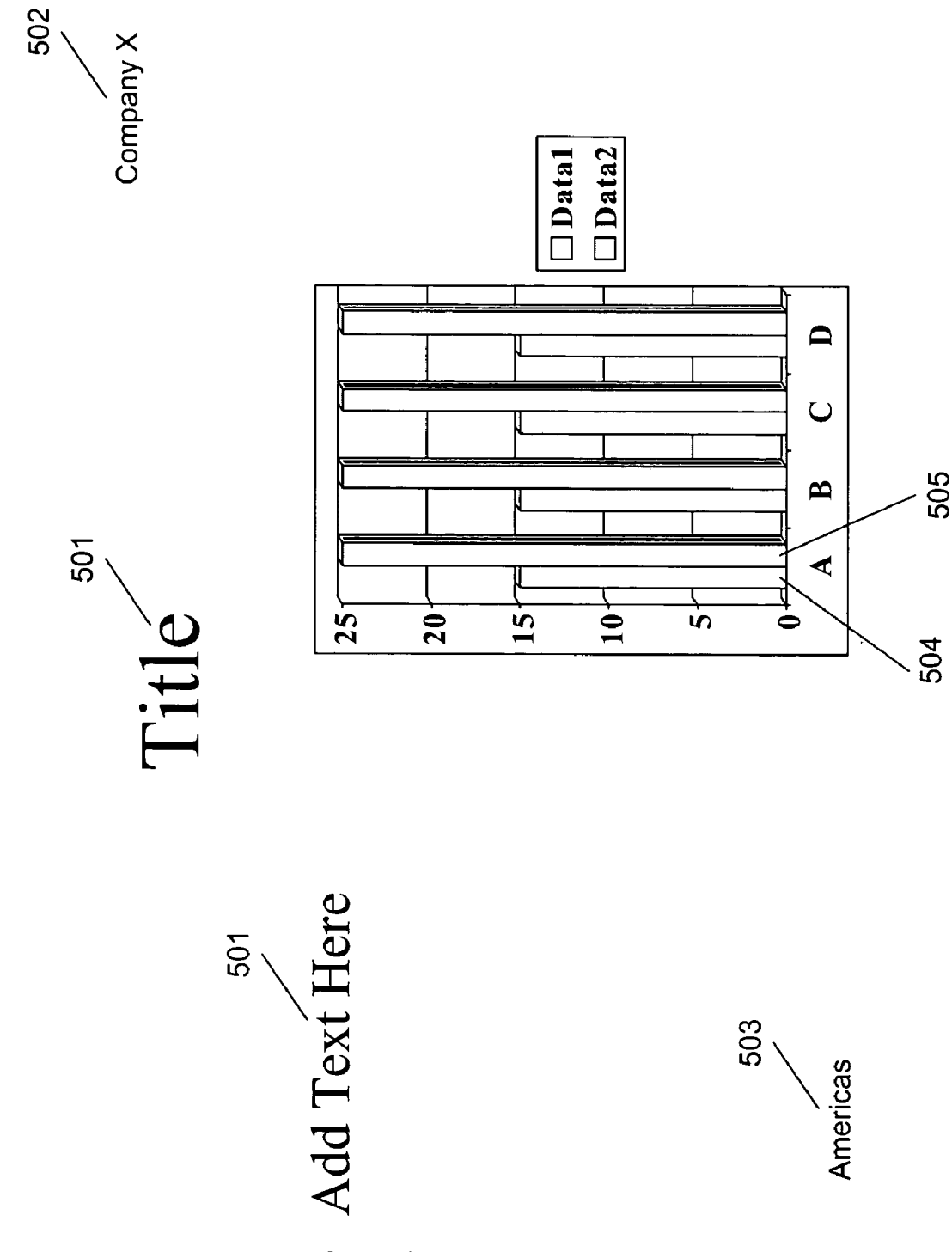
FIG. 5 is a sample document template generated according to an exemplary embodiment of the invention.

An example of a generated document template is shown with FIG. 5. A template Powerpoint presentation generated using some of the attributes in the example RAR 200 in FIG. 2 is shown with FIG. 5. In particular, FIG. 5 shows a template Powerpoint presentation that includes several template attributes specified in an RAR. For example, text 501 has a "Times New Roman" font which may be specified in the attribute field 203 in the RAR 200. Although not shown as fields in the RAR 200, a header of "Company X" 502 and a footer of "Americas" 503 may also be specified in the RAR. Further, chart colors 504 and 505 may be specified in the attribute field 217 in the RAR 200. Once the user is presented with a document template, such as the one shown in FIG. 5, the user may then modify it to include the information he or she desires.

The generated document template, shown for example with FIG. 5, allows all documents in the organization to have a similar appearance and saves the organization's employees from wasting valuable time manually addressing the appearance of their documents, thereby increasing productivity. Further, by maintaining RARs instead of full document templates for each template type, templates are efficiently and effectively organized, thereby reducing operating costs.

It is to be understood that the above-described embodiment is merely illustrative of the present invention and that many variations of the above-described embodiment can be devised by one skilled in the art without departing from the scope of the invention. It is therefore intended that such variations be included within the scope of the following claims and their equivalents.

What is claimed is:

1. A method for facilitating generation of a template comprising:

sending a request to retrieve a copy of an information repository through the computer network, the information repository comprising network data identifying portions of a computer network to which attribute repositories apply, the information repository selecting an attribute repository from a plurality of attribute repositories with the most up-to-date version of attributes;

receiving the copy of an information repository from the computer network and storing the information repository in said computer-readable memory;

sending a request to retrieve a copy of the selected attribute repository through a computer network, the attribute repository comprising attributes, the attributes being divided into default attributes and template-type-specific attribute categories that include attributes that are specific to a particular template type, the attributes that are specific to a particular template type having been entered by a system administrator via a user-interface;

receiving the copy of the attribute repository from the computer network and storing the attribute repository in a computer-readable memory;

retrieving attributes from the computer-readable memory based on a selected template type;

instructing a computer-executable document generating application to generate the template of the selected template type in accordance with the attributes; and generating the template of the selected template type in accordance with the attributes.

2. The method of claim 1 further comprising:

outputting configurable attributes, the configurable attributes comprising at least a portion of the retrieved attributes and being capable of configuration; and receiving information specifying how the configurable attributes are to be configured.

3. The method of claim 1 wherein at least one of the retrieved attributes is a paper size attribute, a paper orientation attribute, a font type attribute, a font size attribute, a color attribute, a chart attribute, a diagram attribute, a table attribute, an image attribute, or a line attribute.

4. The method of claim 2 wherein at least one of the retrieved attributes is a paper size attribute, a paper orientation attribute, a font type attribute, a font size attribute, a color attribute, a chart attribute, a diagram attribute, a table attribute, an image attribute, or a line attribute.

5. A computer-readable memory carrying one or more sequences of instructions for managing template attributes, wherein execution of the one of more sequences of instructions by a computer causes the computer to perform the steps of:

sending a request to retrieve a copy of an information repository through the computer network, the information repository comprising network data identifying portions of a computer network to which attribute repositories apply, the information repository selecting an attribute repository from a plurality of attribute repositories with the most up-to-date version of attributes;

receiving the copy of the information repository from the computer network and storing the information repository in said computer-readable memory;

sending a request to retrieve a copy of the selected attribute repository through a computer network, the attribute repository comprising plurality of categories of data, each category associated with data pertaining to a template type; and a plurality of sets of attributes, each set belonging to one of default template attributes and said categories, the attributes belonging to said categories having been entered by a system administrator via a user-interface;

receiving the copy of the attribute repository from the computer network and storing the attribute repository in said computer-readable memory;

retrieving attributes from the computer-readable memory based on a selected template type;

instructing a computer-executable document generating application to generate the template of the selected template type in accordance with the attributes; and generating the template of the selected template type in accordance with the attributes.

6. The computer-readable memory of claim 5, further comprising: a set of attributes that defines a format of templates associated with at least two template types.

7. The computer-readable memory of claim 5, wherein the information repository further comprises data identifying the template types associated with each attribute repository of the plurality of attribute repositories.

8. The computer-readable memory of claim 5, wherein the information repository further comprises data identifying current version information associated with the plurality of attribute repositories.

9. The computer-readable memory of claim 8, wherein the information repository further comprises data identifying addresses of computers to which the plurality of attribute repositories and the information repository are to be distributed.

* * * * *